(12) United States Patent
Forutanpour

(10) Patent No.: US 7,995,845 B2
(45) Date of Patent: Aug. 9, 2011

(54) DIGITAL SIGNAL PATTERN DETECTION AND CLASSIFICATION USING KERNEL FUSION

(75) Inventor: Babak Forutanpour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 862 days.

(21) Appl. No.: 12/022,974

(22) Filed: Jan. 30, 2008

(65) Prior Publication Data

US 2009/0190837 A1 Jul. 30, 2009

(51) Int. Cl.
*G06K 9/46* (2006.01)
(52) U.S. Cl. ........ 382/203; 382/103; 382/282; 382/167; 382/274; 382/225; 348/221.1; 348/222.1; 348/364; 348/365; 348/675
(58) Field of Classification Search .................. 382/203, 382/103, 282, 167, 274, 225; 348/221.1, 348/222.1, 364, 365, 675
See application file for complete search history.

(56) References Cited

U.S. PATENT DOCUMENTS
6,798,910 B1   9/2004 Wilson
6,922,488 B2 *  7/2005 Mastrianni et al. ........... 382/199
6,941,026 B1 *  9/2005 Nadabar et al. ............... 382/265

FOREIGN PATENT DOCUMENTS
EP   0449259 A2   10/1991
EP   1624672 A1    2/2006
WO   WO9708610 A1  3/1997

OTHER PUBLICATIONS

BDTI: "Emulate SIMD in software" Internet, [Online] Feb. 16, 2007, XP007908957 Internet Retrieved from the Internet: URL:http://www.eetasia.com/ARTP_8800453603_1034362.HTM> [retrieved on Jun. 23, 2009].
European Search Report—EP08006449, International Search Authority—European Patent Office-Jul. 1, 2009.
International Search Report and Written Opinion—PCT/US2009/032428, International Search Authority—European Patent Office-Jul. 1, 2009.
Jahne B: Digitale Bildverarbeitung, Kanten 1-4, Inv Digitale Bildverarbeitung, XX, XX, Jan. 1, 2001, pp. 333-356, XP002300542.

(Continued)

*Primary Examiner* — Mike Rahmjoo
(74) *Attorney, Agent, or Firm* — Matthew J. Evans; James R. Gambale, Jr.

(57) ABSTRACT

This disclosure describes techniques for determining a shape of a signal. In particular, a kernel is applied to a portion of a signal to compute at least a first, first order derivative of the portion of the signal and a second, first order derivative of the portion of the signal in a single pass of the kernel. The shape of the portion of the signal is determined based on the first and second first order derivatives. In one example, the shape of the portion of the signal is determined based on the ratio of the first, first order derivative and the second, first order derivative. These techniques may be particularly effective for detecting edges within image signals. However, the techniques may be used to detect the shape of significant changes within any signal that represents a variable that is changing over time, space or other dimension.

46 Claims, 6 Drawing Sheets

OTHER PUBLICATIONS

John Canny: "A Computational Approach to Edge Detection" IEEE Transactions on Pattern Analysis and Machine Intelligence, IEEE Service Center, Los Alamitos, CA, US, vol. 30, No. 6, Nov. 1, 1986, pp. 679-698, XP011242974 ISSN: 0162-8828.

Lindeberg T: "Edge Detection and Ridge Detection With Automatic Scale Selection" International Journal of Computer Vision, Kluwer Academic Publishers, Norwell, US, vo 1 .. 30, No. 2, Nov. 1, 1998, pp. 117-154, XP000800307 ISSN: 0920-5691.

May et al: "Blurred edges look faint, and faint edges look sharp: The effect of a gradient threshold in a multi-scale edge coding model" Vision Research, Pergamon Press, Oxford, GB, vol. 47, No. 13, May 19, 2007, pp. 1705-1720, XP022084951 ISSN: 0042-6989.

Zhang W et al: "Multi-Scale Blur Estimation and Edge Type Classification for Scene Analysis" International Journal of Computer Vision, Kluwer Academic Publishers, Norwell, US, vol. 24, No. 3, Sep. 1, 1997, pp. 219-250, XP000703582 ISSN: 0920-5691.

Green, Bill, "Edge Detection Tutorial," Retrieved from <http://www.pages.drexel.edu/~weg22/edge.html> 2002.

* cited by examiner

| | | | | |
|---|---|---|---|---|
| 10 | 20 | 30 | 40 | 50 |
| 10 | 20 | 30 | 40 | 50 |
| 10 | 20 | 30 | 40 | 50 |
| 10 | 20 | 30 | 40 | 50 |
| 10 | 20 | 30 | 40 | 50 |

| | | | | |
|---|---|---|---|---|
| 10 | 10 | 10 | 50 | 50 |
| 10 | 10 | 10 | 50 | 50 |
| 10 | 10 | 10 | 50 | 50 |
| 10 | 10 | 10 | 50 | 50 |
| 10 | 10 | 10 | 50 | 50 |

DIGITAL SIGNAL PATTERN DETECTION AND CLASSIFICATION USING KERNEL FUSION

TECHNICAL FIELD

This disclosure relates to signal processing, and more specifically, detecting shapes of signals.

BACKGROUND

Detecting locations of a signal at which a variable represented by the signal exhibits significant change may be useful in analyzing and processing signals. In particular, detecting locations that exhibit significant changes in a variable may be useful in analyzing a shape of the signal, content within the signal or the like. Detecting significant changes may be useful in a number of fields, including image processing, audio processing, video processing or any other information processing applications.

In the field of image processing, for example, detecting locations of the image signal where significant changes in intensity occur may be useful in detecting edges within the image. These detected edges typically represent structural properties of the scene of interest, such as discontinuities in depth, discontinuities in surface orientation, changes in material properties, variations in scene illumination or the like.

An image signal includes a plurality of pixel values that represent intensity and/or color at particular locations within a scene of interest. To detect edges within an image signal, an image processor applies a kernel filter to the image. The kernel filter may be viewed as a matrix of weights or multiplication factors. The matrix is typically much smaller than the actual image to which it is applied. A typical kernel matrix used for edge detection, for example, may be three pixels by three pixels (i.e., a 3×3 kernel).

In order for the image processor to detect edges, the image processor may apply the kernel matrix to each of the pixels of the image in turn by sliding the kernel over the image. The image processor centers the kernel on each pixel of the image in turn, and multiplies the pixel values of the 3×3 region around the center pixel by the corresponding weights of the kernel matrix to generate weighted pixel values.

The image processor sums the weighted pixel values to obtain a first order derivative of the 3×3 portion of the image signal. The image processor compares the first order derivative of the 3×3 portion of the image signal to a threshold value and detects an edge when the first order derivative is greater than or equal to the threshold value. Different kernels may be applied to perform different types of filtering.

SUMMARY

This disclosure is directed to techniques for determining a shape of a signal. The techniques may be used to detect locations of a signal at which a variable represented by the signal exhibits significant change and determine how the variable changes over the detected locations. In this manner, the techniques may be viewed as detecting digital signal patterns and classifying the detected patterns. In the context of image processing, for example, the techniques may be used to detect edges within an image signal, i.e., locations of a digital image signal that exhibit significant changes in intensity. In this context, the digital signal patterns are the edges within the image signal.

The techniques may detect edges, and concurrently determine the shape of the detected edges. For example, the techniques may be used to determine whether the detected edges are sharp or smooth. A sharp edge, sometimes referred to as a hard edge, may occur over a single pixel. A smooth edge, sometimes referred to as a soft edge, may occur over several pixels. To detect edges and discern edge shape, i.e., as sharp or smooth, the techniques may employ a fused kernel that computes multiple first order derivatives at locations in a single pass.

Determining the shape of the detected edges may enhance the capability of an image processor to process the image signal to generate a sharper image by sharpening smooth edges more aggressively than sharp edges. The techniques described in this disclosure may be used to detect significant changes and the shapes of the significant changes within a signal that represents a variable that is changing over time, space or another dimension. For example, the techniques may be used to detect significant changes within audio signals, video signals or other types of signals.

In one aspect, a method comprises applying a kernel to a portion of the signal to compute at least a first, first order derivative of the portion of the signal and a second, first order derivative of the portion of the signal in a single pass of the kernel, and determining a shape of the portion of the signal based on the first and second first order derivatives.

In another aspect, a device comprises a processor including an edge detection module to apply a kernel to a portion of the signal to compute at least a first, first order derivative of the portion of the signal and a second, first order derivative of the portion of the signal in a single pass of the kernel and determine a shape of the portion of the signal based on the first and second first order derivatives.

In another aspect, a computer readable medium comprising instructions to cause a processor to apply a kernel to a portion of a signal to compute at least a first, first order derivative of the portion of the signal and a second, first order derivative of the portion of the signal in a single pass of the kernel and determine a shape of the portion of the signal based on the first and second first order derivatives.

In another aspect, a device comprises means for applying a kernel to a portion of a signal to compute at least a first, first order derivative of the portion of the signal and a second, first order derivative of the portion of the signal in a single pass of the kernel, and means for determining a shape of the portion of the signal based on the first and second first order derivatives.

The techniques described in this disclosure may be implemented in hardware, software, firmware, or any combination thereof. If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. The software that executes the techniques may be initially stored in a computer-readable medium and loaded and executed by a processor. Accordingly, this disclosure also contemplates computer-readable medium comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more examples are set forth in the accompanying drawings and the description below. Other

DETAILED DESCRIPTION

Figure 1:
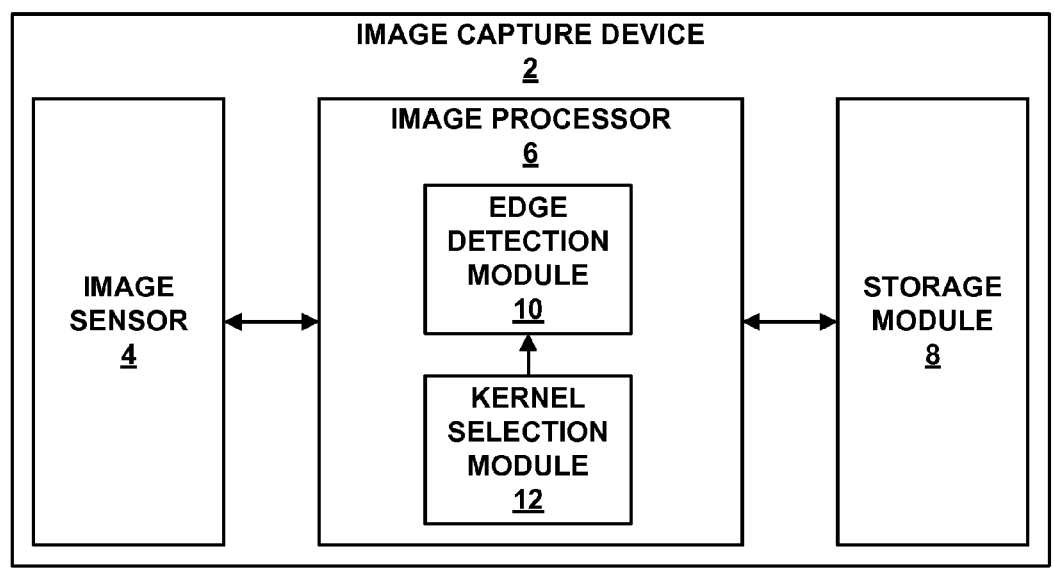
FIG. 1 is a block diagram of an example image capture device that implements the techniques described in this disclosure.

FIG. 1 is a block diagram of an example image capture device 2 that implements the techniques described in this disclosure. Image capture device 2 may be a digital camera, such as a digital still image camera, a digital video camera or a combination of both. In addition, image capture device 2 may be a stand-alone device, such as a stand-alone camera, or be integrated in another device, such as a wireless communication device. As an example, image capture device 2 may be integrated in a mobile wireless phone to form a so-called "camera phone" or "video phone."

As shown in FIG. 1, image capture device 2 includes an image sensor 4, an image processor 6 and a storage module 8. Image sensor 4 captures still images, or possibly full motion video sequences, in which case the edge detection techniques may be performed on one or more image frames of the video sequence. Image sensor 4 may include a two-dimensional array of individual image sensor elements, e.g., arranged in rows and columns. In some aspects, each of the image sensor elements of image sensor 4 may be associated with a single pixel. In other words, there may be a one-to-one correspondence between image sensor elements and pixels. Alternatively, there may be more than one image sensor element associated with each pixel or more than one pixel associated with each image sensor element. Image sensor 4 may comprise, for example, an array of solid state sensors such as complimentary metal-oxide semiconductor (CMOS) sensors, charge coupled device (CCD) sensors or the like. Moreover, image sensor 4 may maintain one or more image buffers to which it stores image information during image acquisition.

To capture the image, image sensor 4 exposes the image sensor elements to the image scene to capture the image. The image sensor elements within image sensor 4 may, for example, capture intensity values representing the intensity of the light of the scene at a particular pixel position. More specifically, the image sensor elements capture intensity values representing the intensity of light reflecting off objects within the scene of interest. In some cases, each of the image sensor elements of image sensor 4 may only be sensitive to one color, or color band, due to the color filters covering that element. For example, image sensor 4 may comprise for example, an array of red, green, and blue (RGB) filters. Image sensor 4 may utilize other color filters, however, such as cyan, magenta, yellow, and black (CMYK) color filters. Thus, each of the image sensor elements of image sensor 4 may capture intensity values for only one color. Thus, the image information may include pixel intensity values captured by the sensor elements of image sensor 4.

The pixel intensity values captured by the image sensor elements vary throughout the image based on the intensity of the light reflecting off the objects. Significant transitions from small pixel intensity values to large pixel intensity values or from large pixel intensity values to small pixel intensity values typically correspond with an edge within the image. For example, the significant changes in intensity values may represent an edge of an object within the image. In some instances, the transition in pixel intensity values may be a sharp transition that occurs over one or two pixels. For example, two neighboring pixels may have significantly different intensity values. These types of sharp transitions may be referred to as "sharp edges" or "hard edges." As used herein, the terms sharp edges and hard edges may be used interchangeably. In other instances, the transition in pixel intensity values may occur gradually over a larger number of pixels. For example, the transition may occur gradually over five or more pixel values. These types of smooth, gradual transitions may be referred to as "smooth edges" or "soft edges." As used herein, the terms smooth edges and soft edges may be used interchangeably. Soft edges may appear as a blurry edge to a user, while hard edges may appear to be sharper.

Image processor 6 obtains a digital image signal for an image (or frame), e.g., from a buffer of image sensor 4, and performs the shape detection techniques described in this disclosure. The shape detection techniques will be described in terms of detecting edges, and concurrently determining the shape of the detected edges, i.e., whether the edges are hard or soft. Image processor 6 includes an edge detection module 10 and a kernel selection module 12. Edge detection module 10 may, in the case of digital image signals, analyze the pixel intensity values of the image to identify edges within the image. In particular, edge detection module 10 applies a kernel to detect edges within the image signal. As will be described in more detail below, the kernel may be viewed as a matrix of weights or multipliers to be applied to portions of the image, e.g., a 5×5 portion of an image. In some instances, edge detection module 10 may apply the kernel to detect both hard edges and soft edges within the image. In other instances, edge detection module 10 may detect only soft edges or only hard edges. In this latter case, edge detection module 10 performs selective edge detection, i.e., detection of only edges of a particular shape.

Edge detection module 10 receives the kernel from kernel selection module 12. In some instances, kernel selection module 12 may select a kernel to apply to the image signal from a plurality of kernels. For example, image capture device 2 may store a first kernel that is used to detect edges in the vertical direction and a second kernel that is used to detect edges in the horizontal direction in storage module 8, and kernel selection module 12 may select either the horizontal edge detection kernel or the vertical edge detection kernel based on whether edge detection module 10 is detecting edges in the vertical or horizontal direction. In this manner, kernel selection module 12 may automatically select the kernel to be used in edge detection.

As another example, image capture device 2 may store a plurality of kernels for use in detecting edges in images of different resolutions. The kernels may, for example, increase in dimension as the resolution of the image sensor output increases. In other words, the higher the resolution of the image sensor output, the larger the dimension of the kernel. For example, kernel selection module 12 may select a kernel with a dimension of 5×5 for an image sensor output with a resolution of 320×240 and select a kernel with a dimension of 7×7 size for an image sensor output with a resolution of 2560×1920. In this manner, kernel selection module 12 may select the kernel to be used in edge detection based on the resolution of the image sensor output. In some instances, image capture device 2 may not store pre-defined kernels within storage module 8, but instead kernel selection module 12 may generate the kernels on the fly, e.g., according to a mathematical function.

After selection of the kernel by kernel selection module 12, edge detection module 10 applies the selected kernel to the image. Edge detection module 10 may perform a convolution between the image and the kernel. To perform the image convolution, edge detection module 10 centers the kernel on each pixel of the image in turn, and computes the sum of the kernel multiplied by the pixel values. This sum is then assigned to the pixel. In accordance with the techniques described herein, application of the kernel generates a sum that represents at least two first order derivatives of the portion of the signal in a single pass. In other words, the at least two first order derivatives of the portion of the signal are generated by application of a single kernel. As will be described in further detail below, the values of different orders of magnitude of the generated sums represent the at least two first order derivatives. For a generated sum of 80,160, for example, a value of a first order of magnitude, i.e., 80,000, may represent a first, first order derivative and a value of a second order of magnitude, i.e., 160, may represent a second, first order derivative. In this manner, edge detection module 10 computes two or more first order derivatives for a portion of the signal in a single pass of a single kernel. The single kernel that is applied using the techniques of this disclosure may be viewed as a fused kernel, as it provides results that typically require application of more than one kernel.

Computing two or more first order derivatives of a portion of the signal with the fused kernel in a single pass may reduce the amount of processing resources used for edge detection by eliminating the need to apply two or more kernels in two or more passes. Additionally, the techniques may reduce the amount of time it takes to detect edges within the image. Unlike the techniques described herein, conventional image processors only compute one first order derivative per pass, and thus would require more than one pass of more than one kernel to detect at least two first order derivatives for the portion of the signal. To compute two first order derivatives, conventional image processors apply a first kernel to the portion of the image to obtain a first, first order derivative and apply a second kernel to the portion of the image to obtain a second, first order derivative.

Edge detection module 10 uses the at least two first order derivatives to determine whether the pixel is located at an edge and, if located at an edge, a shape of edge, e.g., sharp/hard or smooth/soft. Edge detection module 10 may normalize the first order derivatives and compare at least one of the first order derivatives to one or more thresholds or threshold ranges to determine whether the pixel is located at an edge within the signal. For example, edge detection module 10 may compare the at least one of the first order derivatives to a threshold value to ensure that the change is significant enough to be an edge. If edge detection module 10 determines the pixel is located at an edge, edge detection module 10 may determine the shape of the edge at which the pixel is located. Edge detection module 10 may, for example, determine the shape of the edge based on the ratio of the first order derivatives. In this manner, edge detection module 10 analyzes the signal to determine the shape of the signal. The threshold values and ranges may be adjusted such that edge detection module 10 detects hard edges, soft edges or both.

Image processor 6 may process the captured image using the detected edges. For example, image processor 6 may sharpen the image based on the detected edges. The amount of sharpening performed on a detected edge within the image, therefore, may be a function of whether or not the edge is detected as a hard edge or soft edge. Image processor 6 may sharpen soft edges using a more aggressive sharpening technique than used to sharpen hard edges. Sharpening hard edges using the same sharpening techniques used for sharpening soft edges may result in clipping artifacts at the hard edges, which creates noise and a reduced quality image. Thus, image processor 6 may use a sharpening mask that increases the contrast between the two sides of the edges more aggressively when the edge is detected to be a soft edge and use a sharpening mask that increases the contrast between the two sides of the edge less aggressively when the edge is detected to be a hard edge. In this manner, image processor 6 may use the computed first order derivatives and, more particularly, the ratio of the two first order derivatives as a heuristic to a sharpening function performed by image processor 6. Image processor 6 may perform other image processing on the image based on the detected edges within the image. In other words, the computed first order derivatives may function as a heuristic to other image processing functions performed by image processor 6.

Image processor 6 may be realized by one or more integrated circuit devices, such as one or more microprocessors, digital signal processors (DSPs), application specific integrated circuits (ASICs), field programmable gate arrays (FPGAs), or any other equivalent discrete or integrated logic circuitry, or a combination thereof. In some instances, image processor 6 may form part of an encoder-decoder (CODEC) that encodes the image information according to a particular encoding technique or format, such as Motion Pictures Expert Group (MPEG)-2, MPEG-4, International Telecommunication Union (ITU) H.263, ITU H.264, Joint Photographic Experts Group (JPEG), Graphics Interchange Format (GIF), Tagged Image File Format (TIFF) or the like. Image processor 6 may perform additional processing on the image information, such as image cropping, compression, enhancement and the like.

Image processor 6 may store the captured image in storage module 8. Alternatively, image processor 6 may perform additional processing on the image and store either the entire image in processed or encoded formats in storage module 8. If the image information is accompanied by audio information, the audio information also may be stored in storage module 8, either independently or in conjunction with video information comprising one or more frames containing the image information. Storage module 8 may comprise any volatile or non-volatile memory or storage device, such as read-only memory (ROM), electrically erasable programmable read-only memory (EEPROM), or FLASH memory, or such as a magnetic data storage device or optical data storage device.

A number of other elements may also be included in image capture device 2, but are not specifically illustrated in FIG. 1 for simplicity and ease of illustration. For example, image capture device 2 may include additional components for capturing images, such as a lens, a shutter, a flash device and a viewfinder. The architecture illustrated in FIG. 1 is merely exemplary, as the techniques described in this disclosure may be implemented with a variety of other architectures. Moreover, the features illustrated in FIG. 1 may be realized by any suitable combination of hardware and/or software components.

Although the techniques are described herein in the context of an image capture device that detects edges within image signals, the techniques may be used by other types of devices to detect the shape of significant changes within any signal that represents a variable that is changing over time, space or other dimension. For example, the techniques may be used to detect the shape of significant changes within audio signals, video signals or any other types of signals. However, the techniques may be applicable to detecting digital signal patterns in any signal and classifying the detected digital signal patterns.

Figure 2A:
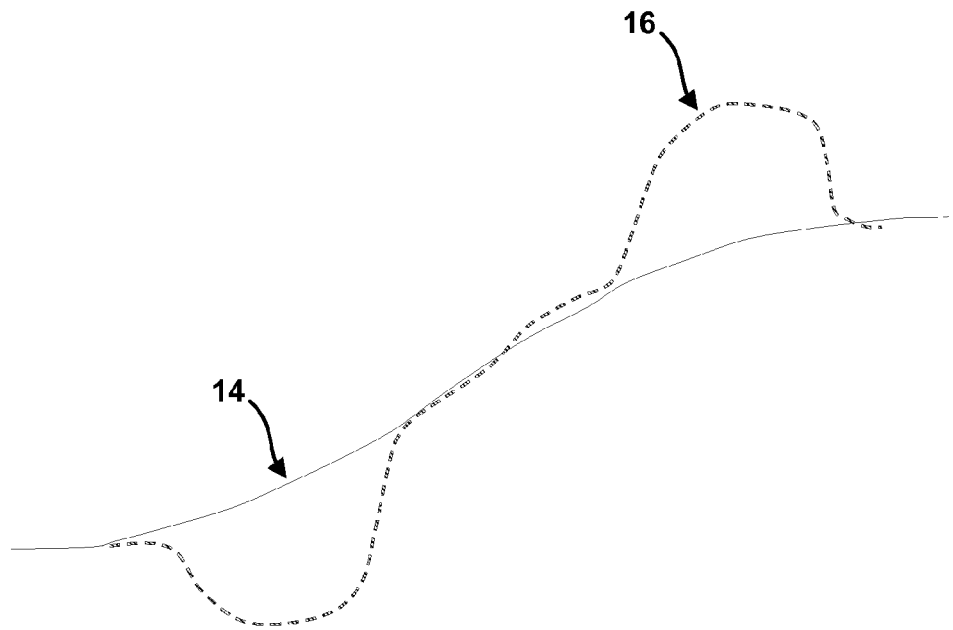
FIGS. 2A and 2B illustrate application of a sharpening mask to hard and soft edges within an image signal.
Figure 2B:
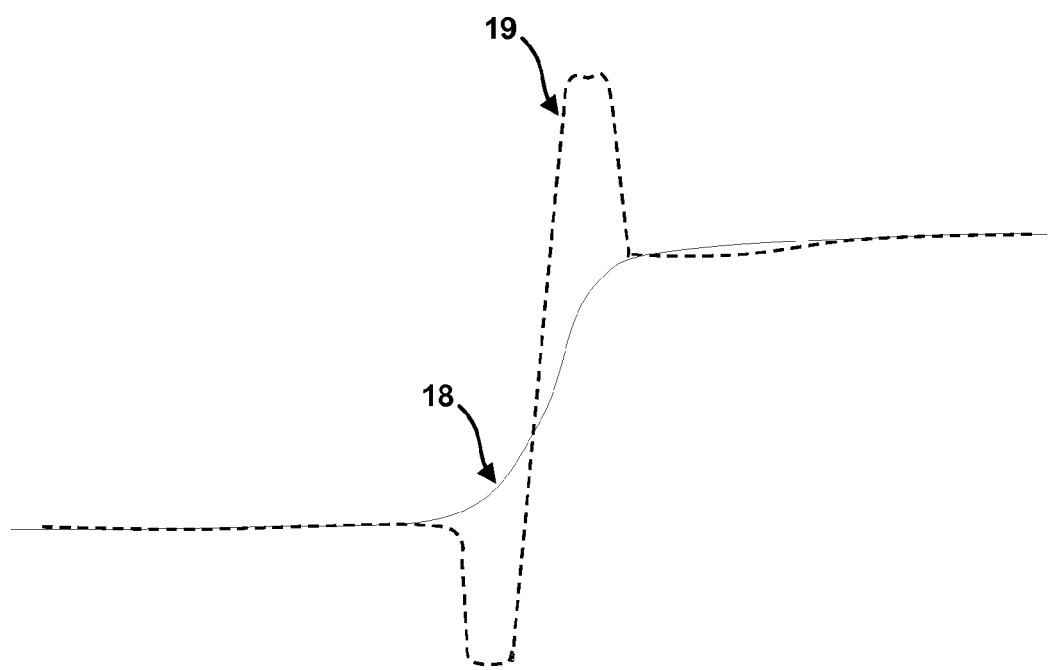

FIGS. 2A and 2B illustrate application of a sharpening mask to hard and soft edges within an image signal. FIG. 2A illustrates application of the sharpening mask to a portion of an image signal that includes a soft edge. Image signal 14 represents the portion of the original image signal before sharpening. As described above, the soft edge within image signal 14 may appear blurry to a viewer due to the smooth, gradual manner in which the pixel intensity transition occurs. To sharpen the soft edge, image processor 6 may apply a sharpening mask that includes weighted values that reduce the pixel intensity values of a darker side of the edge within image signal 14 and increase the pixel intensity values of a lighter side of the edge within image signal 14. The weighted values of the sharpening mask are large enough that the contrast between the darker side of the edge and the lighter side of the edge make the edge appear sharper to a viewer. Image signal 16 represents the resulting image signal after applying the sharpening mask to image signal 14. As illustrated in FIG. 2A, the low intensity (dark) regions of image signal 16 are significantly lower than in the original image signal 14 and the high intensity (light) regions of image signal 16 are significantly higher than in the original image signal 16.

FIG. 2B illustrates application of the same sharpening mask to a portion of an image signal that includes a hard edge. Image signal 18 represents the portion of the original image signal before sharpening. As described above, the hard edges within image signal 18 already appear sharp to a viewer. If the edge detection module is unable to differentiate between hard and soft edges, however, image processor 6 applies the sharpening mask to the hard edges as well as the soft edges. Image signal 19 represents the resulting image signal after applying the sharpening mask to image signal 18. As illustrated in FIG. 2B, application of the sharpening mask used to sharpen soft edges to image signal 18 results in clipping artifacts in the low intensity and high intensity regions of image signal. In other words, the low intensity regions of the image signal 19 are clamped at black and the high intensity regions of image signal 19 are clamped at white. The resulting image signal includes noise, e.g., which may appear to the viewer as salt and pepper noise.

The signal shape detection techniques described in this disclosure allow image processor 6 to selectively sharpen the edges within the captured image. For example, edge detection module 10 may selectively detect edges within the image signal such that only soft edges are detected and sharpened. As another example, edge detection module 10 may identify the shape of the detected edges, and image processor 6 may sharpen the soft edges using a sharpening filter with larger weights and sharpen the hard edges using a sharpening filter with smaller weights. For example, image processor 6 may sharpen the image based on the detected edges. In this manner, image processor 6 may use the shape of the detected edges as a heuristic to a sharpening function performed by image processor 6.

Figures 3A, 3B:
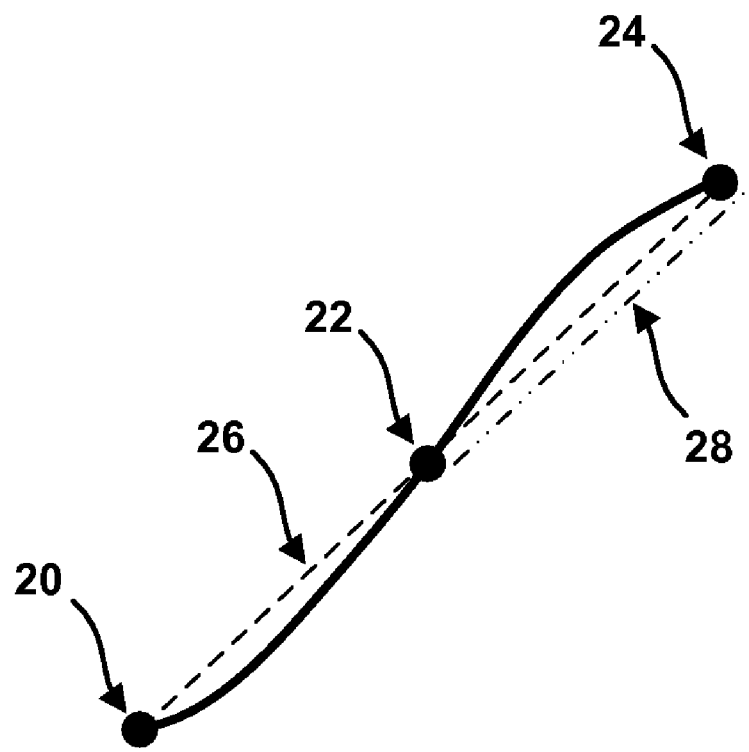
FIGS. 3A and 3B illustrate an example portion of an image signal that includes a soft edge and pixel values corresponding to the portion of the image signal.

FIG. 3A illustrates an example portion of an image signal that includes a soft edge. FIG. 3B illustrates pixel intensity values of a five pixel by five pixel (5×5) region corresponding to the portion of the image signal. In particular, the pixel intensity values of the 5×5 region shown in FIG. 3B corresponds with the portion of the image signal illustrated in FIG. 3A. The image signal illustrated in FIGS. 3A and 3B transitions from a pixel intensity value of ten to a pixel intensity value of fifty in a relatively smooth, gradual manner over a five pixel span. As shown by the pixel intensity values of FIG. 3B, the image signal incrementally increases from ten to fifty in a gradual fashion. Points 20, 22 and 24 of the portion of the digital image signal illustrated in FIG. 3A correspond with the pixel intensity values at columns one, three and five of the pixel intensity values illustrated in FIG. 3B.

Application of an example kernel to the pixel in the third row and third column of the example portion of the image to determine that the pixel is on an edge, and more particularly on a soft edge, will be described for illustrative purposes. Edge detection module 10 may apply the example kernel in a similar manner to other pixels within the image. In some instances, edge detection module 10 may apply the kernel in a similar way to all the pixels within the image. In other instances, edge detection module 10 may apply the kernel to only a subset of the pixels within the image, e.g., pixels in every other row or column. Although described in terms of the example kernel (1) illustrated on the next page, the techniques may be utilized with kernels of different dimensions, kernels with more or less non-zero values, kernels with different non-zero values or a combination thereof.

$$\begin{bmatrix} 0 & 0 & 0 & 0 & 0 \\ -1 & 0 & -1000 & 0 & 1001 \\ -2 & 0 & -2000 & 0 & 2002 \\ -1 & 0 & -1000 & 0 & 1001 \\ 0 & 0 & 0 & 0 & 0 \end{bmatrix} \quad (1)$$

The example 5×5 kernel illustrated above has at least one row that has a first column that includes at least one negative value of a first order of magnitude, a second column that includes at least one negative value of a second order of magnitude and a third column that includes at least one positive value that includes a component of the first order of magnitude and a component of the second order of magnitude. The example 5×5 kernel shown above includes three rows that include non-zero values. The second row of the kernel includes the values −1, 0, −1000, 0 and 1001, the third row of the kernel includes the values −2, 0, −2000, 0 and 2002, and the fourth row of the kernel includes the values −1, 0, −1000, 0 and 1001. Thus, each of the three rows has a negative value that is a first order of magnitude, i.e., −1 or −2, a negative value that is a second order of magnitude, i.e., −1000 or −2000, and a positive value that has a component of the first order of magnitude, i.e., −1 or −2 of the value −1001 and −2002, respectively, and a component that is a second order of magnitude, i.e., −1000 or −2000 of the value −1001 or −2002, respectively. As will be described in detail below, selecting kernel values with first and second orders of magnitude allows edge detection module 10 to generate sums that represent at least two first order derivatives of the portion of the signal in single pass.

The terms "first order of magnitude" and "second order of magnitude," correspond with different orders of magnitude and not necessarily successive orders of magnitude. As illustrated in the example above, the values of the "first order of magnitude," i.e., values −1 and −2, may be viewed as corresponding with a zero-th order of magnitude while the values of the "second order of magnitude," i.e., −1000 and −2000, may be viewed as corresponding with a third order of magnitude. Therefore, as used herein the terms "first order of magnitude" and "second order of magnitude" correspond with different orders of magnitude that may or may not be successive.

The orders of magnitude for the non-zero values in the kernel may be selected, e.g., by an application designer, as a function of the type of signal being analyzed. The example kernel illustrated may be particularly suitable for application to an 8-bit digital image signal, i.e., a digital image signal in which each pixel value is represented using 8-bits. In an 8-bit digital image signal each pixel has a value between 0 and 255. The second order of magnitude selected for the non-zero values is selected such that there is no chance, or at least a significantly small chance, that the sum of the pixel values multiplied by the first order of magnitude non-zero components of a column overflow into the second order of magnitude. Using the 8-bit image as an example, the sum of the maximum pixel value 255 multiplied by the first order of magnitude values, i.e., −1, −2 and −1, is equal to 1020. However, because the likelihood of each of the pixels in the respective positions taking on the value of 255 is significantly small, the example kernel has a second order of magnitude (e.g., 1000). To eliminate any chance of overflow, a larger second order of magnitude may be chosen, e.g., 10,000. For signals represented with larger or smaller numbers of bits, non-zero values with larger or smaller orders of magnitude may be used. For a 16-bit image, for example, non-zero values with larger orders of magnitude may be used, e.g., 1,000,000. Likewise for a 2-bit signal, non-zero values with smaller orders of magnitude may be used, e.g., 100. In this manner, the second order of magnitude of the non-zero values of the kernel may be selected as a function of a maximum possible value of the signal.

To apply the example kernel shown in (1), edge detection module 10 centers the kernel on the portion of the image, such that the kernel is centered on the pixel in the third row and third column. Edge detection module 10 performs a convolution of the portion of the image and the kernel to compute a sum of the kernel multiplied by the pixel values. In particular, each of the pixel intensity values of the portion of the image is multiplied by the value of the corresponding location within the kernel to obtain weighted pixel values and then the weighted pixel values are summed. In the example illustrated above, edge detection module 10 computes a sum of 80,160 for the center pixel location, i.e., (−1)(10)+(−1000)(30)+(1001)(50)+(−2)(10)+(−2000)(30)+(2002)(50)+(−1)(10)+(−1000)(30)+(1001)(50). In this manner, the sum for the particular pixel location is computed as a function of at least a portion of the pixel values in the neighborhood of the particular pixel. The number of non-zero values of the kernel may be added or deleted to include more or fewer neighboring pixel values in the determination.

As described above, the computed sum represents at least two first order derivatives of the portion of the signal to which the kernel is applied. In this example, the sum represents exactly two first order derivatives, i.e., a first, first order derivative that corresponds to a slope of line 28 between point 22 and 24 of the signal illustrated in FIG. 3A and a second, first order derivative that corresponds to a slope of line 26 between point 20 and point 24 of the signal illustrated in FIG. 3A. In particular, a value of a first order of magnitude of the sum, i.e., 80,000, corresponds to the first, first order derivative and a value of a second order of magnitude of the sum, i.e., 160, corresponds to the second, first order derivative. Thus, edge detection module 10 may be viewed as sampling the image signal along the horizontal direction at three points, i.e., points 20, 22 and 24.

Edge detection module 10 may identify the values of the first and second, first order derivatives by performing a divide operation to divide the computed sum of 80,160 by 1000 and use the quotient, i.e., 80, as the first, first order derivative and the remainder, i.e., 160, as the second, first order derivative. In some instances, edge detection module 10 may perform a modulo operation to obtain the remainder of 160. The first, first order derivative corresponds to an amount that the pixel value increased over a first span between point 22 and 24, and the second, first order derivative corresponds to an amount the pixel value increased over a second span between point 20 and point 24. In terms of the slopes of lines 26 and 28, the first, first order derivative corresponds to a first rise over the run between point 22 and 24 and the second, first order derivative corresponds to a second rise over the run between point 20 and 24. The first, first order derivative between point 22 and 24 may be viewed as a leading first order derivative (or slope) and the second, first order derivative between points 20 and 24 may be viewed as a lagging first order derivative (or slope).

Edge detection module 10 may further normalize the first and second rises over the same run. The first rise corresponds with a three pixel run while the second rise corresponds with a five pixel run. To normalize the rises over runs of the same length, edge detection module 10 may multiply the first rise by two. In this manner, the rises are normalized such that both rises correspond with runs over a five pixel span. In the example described above, the normalized first and second rises are both equal to 160. By normalizing the rises to be over a five pixel run, edge detection module 10 may use the values of the rises for purposes of analyzing the slopes of lines 26 and 28.

In other instances, edge detection module 10 may not normalize the rises. Instead, edge detection module 10 may compute the slopes of lines 26 and 28 separately by dividing each of the rises by the corresponding runs, and then comparing the slopes. For example, edge detection module may compute the slope of line 28 by dividing the first rise by two (i.e., the run between the third pixel and the fifth pixel) and compute the slope of line 26 by dividing the second rise by four (i.e., the run between the first pixel and the fifth pixel). However, normalizing the runs and comparing the runs may reduce the number of mathematical operations that edge detection module 10 performs. In particular, computing both slopes requires two division operations and then comparing the ratio of the two slopes requires another division operation. Normalizing the rises, however, only requires one multiplication operation (i.e., multiplying the first rise by two) and comparing the ratio of the two rises requires a division operation. When operating on an image with thousands, or even millions, of pixels, the result would be a reduction of one mathematical operation for each pixel analyzed, resulting in a significant reduction of mathematical operations and associated computational overhead and power consumption.

Edge detection module 10 analyzes the slopes of lines 26 and 28 to determine whether the pixel location corresponds to an edge and, if so, whether the edge is a soft edge or a hard edge. In some aspects, edge detection module 10 may analyze the slopes of lines 26 and 28 by analyzing the normalized rises. Edge detection module 10 may use the rises to analyze the slope because the rises are normalized over the same run length, i.e., over the five pixel span. Edge detection module 10 may compare the second normalized rise corresponding to the span from point 20 to point 24 to a threshold range of values. As one example, edge detection module 10 may determine whether the second normalized rise is greater than or equal to 120 and less than or equal to 300. The threshold range may be selected as a function of the maximum possible value of the pixel, the number of pixel over which the slope runs or both. If the second normalized rise is greater than 300, the slope from point 20 to point 24 is considered too large to constitute a soft edge. If the second normalized rise is less than 120, the slope from point 20 to point 24 is considered not large enough to constitute a noticeable edge. The values of the threshold range may be adjusted based on the type of image being analyzed or the orders of magnitude of the values of the kernel.

If the second normalized rise falls within the threshold range, edge detection module 10 computes the ratio of the two rises to determine whether the edge is a soft edge or a hard edge. If the computed ratio of the two normalized rises is greater than or equal to 0.4 and less than or equal to 1.6, edge detection module 10 detects the edge as a soft edge. In other words, the two rises are close enough to one another to be considered a smooth, gradual edge. If the ratio of the two rises is less than 0.4 or greater that 1.6, edge detection module 10 detects the edge as a hard edge. In this manner, edge detection module 10 determines whether the detected edge is hard or soft based on the ratio of the slopes of the lines 26 and 28.

The threshold values and/or ranges for the slopes and the ratio of the slopes may be adjusted to more aggressively detect edges or less aggressively detect edges. Moreover, the threshold values and/or ranges for the slopes may also be adjusted such that edge detection module 10 detects both hard and soft edges, only soft edges or only hard edges. Thus, the threshold values and/or ranges for the slopes may be adjusted to configure edge detection module 10 to selectively detect edges of particular shapes, e.g., only smooth edges and/or only sharp edges. Detecting only smooth edges may allow image processor 6 (FIG. 1) to selectively sharpen detected edges such that sharp edges are not sharpened in such a manner that reduces the quality of those sharp edges. Conventional first order and second order edge detection kernels may be tuned to find hard and soft edges. However, conventional first order and second order edge detection kernels are unable to be tuned to detect the shape of the edge, e.g., whether the edge is hard or soft, in a single pass because first order and second order edge detection kernels do not generate information regarding neighboring slopes or the slope's rate of change over the portion of the image.

In the example portion of the signal illustrated in FIGS. 3A and 3B, the first and second normalized rises are equal to 160. The first normalized rise falls within the corresponding threshold range of 120-300. The second normalized rise also falls within the corresponding threshold range of 25-300. Therefore, edge detection module determines that the pixel is located on an edge. Moreover, the ratio of the rises is equal to 1, which is within the range that constitutes a soft edge. Edge detection module 10 therefore detects that the pixel of the third row and third column is located on a soft edge. In this manner, edge detection module 10 analyzes the digital image signal to determine the shape of the signal.

In this manner, edge detection module 10 computes two or more first order derivatives of a portion of the signal in a single pass and uses the two or more first order derivatives to determine the shape of the signal. Conventional edge detectors, however, require application of two kernels to detect at least two first order derivatives for the portion of the signal. For example, conventional edge detectors may apply the kernels (2) and (3) illustrated below to generate the two first order derivatives. In particular, conventional edge detectors may apply kernel (2) to detect a first, first order derivative of the portion of the image signal and apply kernel (3) to detect a second, first order derivative of the portion of the image signal.

$$\begin{bmatrix} 0 & 0 & 0 & 0 & 0 \\ -1 & 0 & 0 & 0 & 1 \\ -2 & 0 & 0 & 0 & 2 \\ -1 & 0 & 0 & 0 & 1 \\ 0 & 0 & 0 & 0 & 0 \end{bmatrix} \quad (2)$$

$$\begin{bmatrix} 0 & 0 & 0 & 0 & 0 \\ 0 & 0 & -1 & 0 & 1 \\ 0 & 0 & -2 & 0 & 2 \\ 0 & 0 & -1 & 0 & 1 \\ 0 & 0 & 0 & 0 & 0 \end{bmatrix} \quad (3)$$

Thus, conventional edge detection techniques require approximately twice the amount of processing resources and time to achieve a similar result to the techniques disclosed herein. Edge detection module 10 may obtain the same results by applying only a single kernel, e.g., the kernel illustrated in (1). In this manner, the kernel illustrated in (1) may be viewed as a fusion of kernels (2) and (3) into a single kernel.

To further optimize the kernel, image processor 6 may condense the kernel shown in (1) into a 3×3 kernel. In particular, the rows and columns that include all zero values may be removed from the 5×5 matrix (as shown in (4)) to form a 3×3 condensed kernel (as shown in (5)).

$$\begin{bmatrix} \cancel{0} & \cancel{0} & \cancel{0} & \cancel{0} & \cancel{0} \\ -1 & \cancel{0} & -1000 & \cancel{0} & 1001 \\ -2 & \cancel{0} & -2000 & \cancel{0} & 2002 \\ -1 & \cancel{0} & -1000 & \cancel{0} & 1001 \\ \cancel{0} & \cancel{0} & \cancel{0} & \cancel{0} & \cancel{0} \end{bmatrix} \quad (4)$$

$$\begin{bmatrix} -1 & -1000 & 1001 \\ -2 & -2000 & 2002 \\ -1 & -1000 & 1001 \end{bmatrix} \quad (5)$$

Although the kernel is condensed and stored as a 3×3 kernel, edge detection module 10 may still apply the kernel to 5×5 portions of the image signal.

The example kernel shown in (1) above is applied by edge detection module 10 to detect vertical edges within the image. Edge detection module 10 may apply a second kernel of a substantially similar nature to detect horizontal edges within the image signal. An example kernel that may be used to detect horizontal edges within the image signal in accordance with the techniques of this disclosure is illustrated below.

$$\begin{bmatrix} 0 & -1 & -2 & -1 & 0 \\ 0 & 0 & 0 & 0 & 0 \\ 0 & -1000 & -2000 & -1000 & 0 \\ 0 & 0 & 0 & 0 & 0 \\ 0 & 1001 & 2002 & 1001 & 0 \end{bmatrix} \quad (6)$$

Edge detection module 10 may apply the first and second kernels to the pixel location at the same time or during separate passes. As with the kernel used for detect vertical edges, the kernel used to detect horizontal edges (6) may be viewed as a fusion of kernels (7) and (8).

$$\begin{bmatrix} 0 & -1 & -2 & -1 & 0 \\ 0 & 0 & 0 & 0 & 0 \\ 0 & 0 & 0 & 0 & 0 \\ 0 & 0 & 0 & 0 & 0 \\ 0 & 1 & 2 & 1 & 0 \end{bmatrix} \quad (7)$$

$$\begin{bmatrix} 0 & -1 & -2 & -1 & 0 \\ 0 & 0 & 0 & 0 & 0 \\ 0 & 1 & 2 & 1 & 0 \\ 0 & 0 & 0 & 0 & 0 \\ 0 & 0 & 0 & 0 & 0 \end{bmatrix} \quad (8)$$

Although described in terms of the example kernel illustrated in (1) above, the techniques may be utilized with kernels of different dimensions, kernels with more or fewer non-zero values, kernels with the non-zero values in different locations within the kernel, kernels with different non-zero values or a combination thereof. As an example, the non-zero values of the kernel (1) may be replaced with non-zero values that are powers of two. In the 5×5 kernels shown in (1) and (4), for instance, the values of −1000 may be replaced with −1024, the values of 1001 may be replaced with 1025, the value of −2000 may be replaced with −2048 and the value of 2002 may be replaced with 2050, shown in (9). Using non-zero values that are powers of two may allow edge detection module 10 to make use of a faster shift operator, e.g., using only shifts and divisions.

$$\begin{bmatrix} -1 & -1024 & 1025 \\ -2 & -2048 & 2050 \\ -1 & -1024 & 1025 \end{bmatrix} \quad (9)$$

As another example, the kernel may include rows with four non-zero values of three different magnitudes. An example of such a kernel is illustrated below.

$$\begin{bmatrix} 0 & 0 & 0 & 0 & 0 \\ -1 & 0 & -1000 & -1000000 & 1001001 \\ -2 & 0 & -2000 & -2000000 & 2002002 \\ -1 & 0 & -1000 & -1000000 & 1001001 \\ 0 & 0 & 0 & 0 & 0 \end{bmatrix} \quad (10)$$

The example kernel is composed of rows that include a first negative value of a first order of magnitude, a second negative value of a second order of magnitude, a third negative value of a third order of magnitude and a positive value that has a component of the first order of magnitude, a component of the second order of magnitude and a component of the third order of magnitude. Using such a kernel allows edge detection module 10 to compute three first order derivatives, i.e., slopes of three different spans, in a single pass. Therefore, edge detection module 10 may be able to more accurately determine the shape of edge within the portion of the signal.

As another example, the kernel may include non-zero values arranged in a radial manner instead of a horizontal and vertical manner. Such a kernel is illustrated below.

$$\begin{bmatrix} -1000 & 0 & 0 & 0 & -1000 \\ 0 & -1 & 0 & -1 & 0 \\ 0 & 0 & 4004 & 0 & 0 \\ 0 & -1 & 0 & -1 & 0 \\ -1000 & 0 & 0 & 0 & -1000 \end{bmatrix} \quad (11)$$

The techniques may be utilized with kernels of different dimensions, kernels with more or less non-zero values, kernels with different non-zero values or a combination thereof.

Figures 4A, 4B:
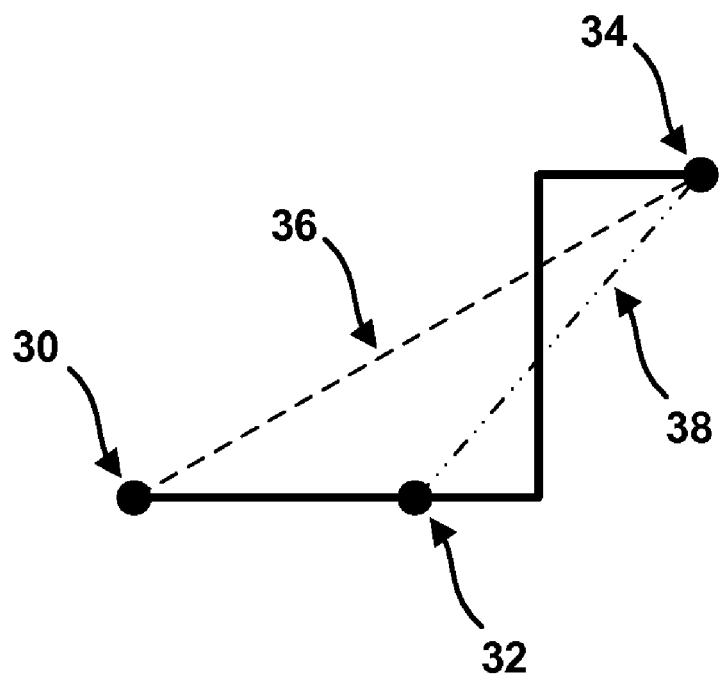
FIGS. 4A and 4B illustrate an example portion of an image signal that includes a hard edge and pixel values corresponding to the portion of the image signal.

FIG. 4A illustrates an example portion of an image signal that includes a hard edge. FIG. 4B illustrates pixel intensity values of a five pixel by five pixel (5×5) region corresponding to the portion of the image signal. In particular, the pixel intensity values of the 5×5 region shown in FIG. 4B corresponds with the portion of the image signal shown in FIG. 4A. Like the 5×5 portion of the image signal illustrated in FIGS. 3A and 3B, the 5×5 portion of the image signal illustrated in FIGS. 4A and 4B transitions from a pixel intensity value of ten to a pixel intensity value of fifty. However, the portion of the image signal illustrated in FIGS. 4A and 4B makes the transition sharply over a single pixel instead of gradually over a five pixel span. As shown by the pixel intensity values of FIG. 4B, this sharp transition occurs between the third column of pixels and the fourth column of pixels. Points 30, 32 and 34 of the portion of the image signal illustrated in FIG. 4A correspond with the pixel intensity values at columns one, three and five of the pixel intensity values illustrated in FIG. 4B.

Application of the 5×5 kernel (1) illustrated above by edge detection module 10 to detect the hard edge in the portion of the signal illustrated in FIGS. 4A and 4B will be described as another example. Edge detection module 10 centers the kernel on the portion of the image such that the kernel is centered on the pixel in the third row and third column. Edge detection module 10 performs a convolution of the portion of the image and the kernel to compute weighted pixel values and sum the weighted pixel values. For the signal illustrated in FIGS. 3A and 3B, edge detection module 10 computes a sum of 160,160 for the center pixel location, i.e., (−1)(10)+(−1000)(10)+(1001)(50)+(−2)(10)+(−2000)(10)+(2002)(50)+(−1)(10)+(−1000)(10)+(1001)(50).

A value of a first order of magnitude of the computed sum, i.e., 160,000, corresponds to a first, first order derivative and a value of a second order of magnitude, i.e., 160, corresponds to the second, first order derivative. Edge detection module 10 may initially normalize the values of the first and second, first order derivatives to the same order of magnitude by using the quotient and remainder of a divide operation. In particular, the quotient of the divide operation, i.e., 160, corresponds with the first, first order derivative and the remainder, i.e., 160, corresponds with the second, first order derivative. As described above, the normalized first, first order derivative corresponds to a first rise over the run between point 32 and 34 and the normalized second, first order derivative corresponds to a second rise over the run between point 30 and 34.

Edge detection module 10 may further normalize the first and second rises over the same run by multiplying the first rise by two. In this manner, the rises are normalized such that both rises correspond with runs over a five pixel span. In the example described above, the normalized first rise is equal to 320 and second rise is equal to 160. By normalizing the rises to be over a five pixel run, edge detection module 10 may use the values of the rises for purposes of analyzing the slopes of lines 26 and 28, instead of individually computing each of the slopes. As described above, such a technique may reduce the number of arithmetic operations performed by edge detection module 10.

In this case, the ratio of the two rises is equal to 2, which is outside of the range of 0.4 to 1.6. Therefore, edge detection module 10 characterizes the edge as a hard edge. As described above, edge detection module 10 may compute the slopes without normalizing the rises over the same run length and analyze the computed slopes. However, such an analysis may require edge detection module 10 to perform additional mathematical operations.

Figure 5:
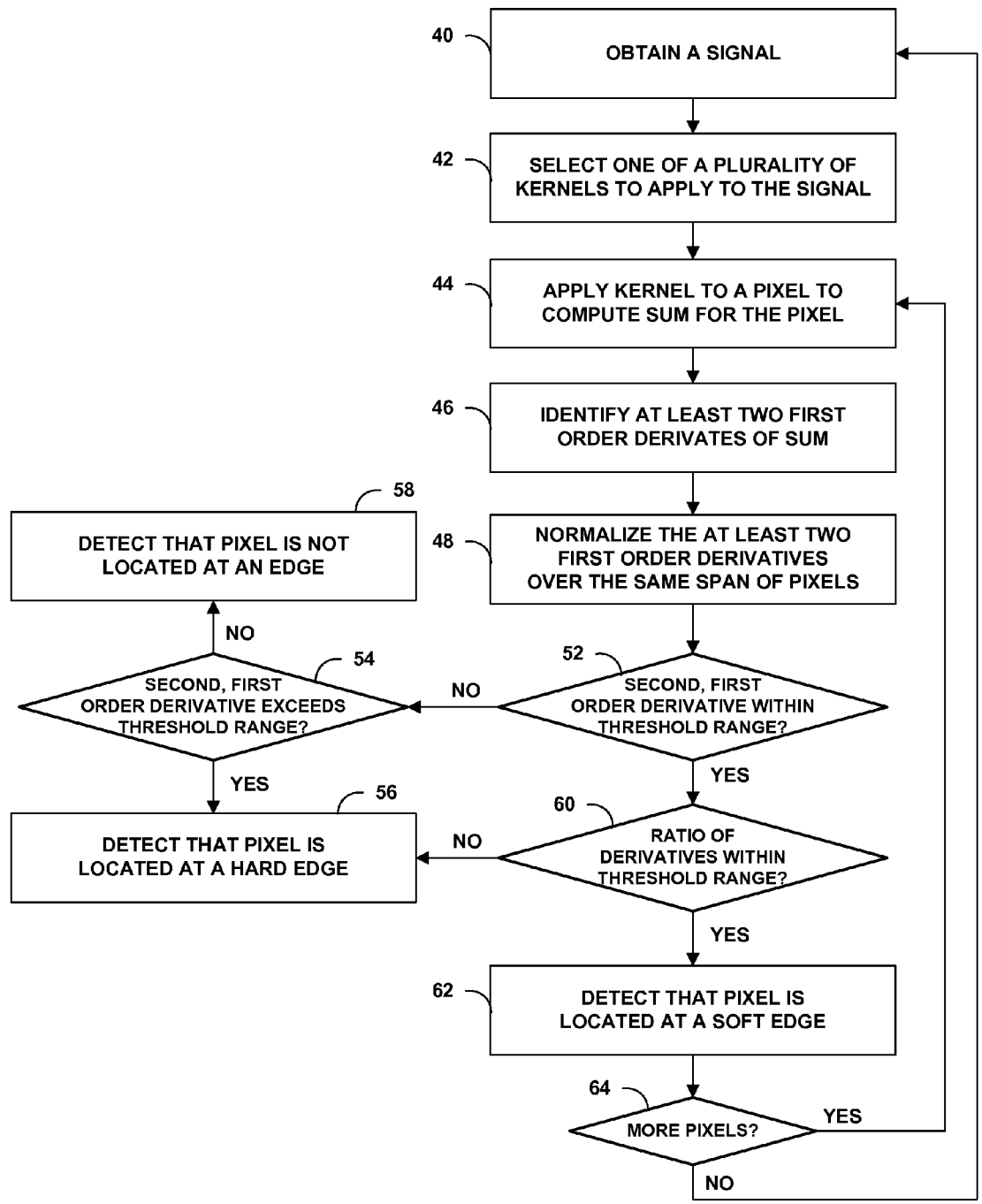
FIG. 5 is a flow diagram illustrating exemplary operation of a processor determining a shape of a signal using the techniques described in this disclosure.

FIG. 5 is a flow diagram illustrating exemplary operation of image processor, such as image processor 6 of FIG. 1, determining a shape of a signal using the techniques described herein. Initially, image processor 6 obtains a signal (40). Image processor 6 may, for example, obtain an image signal from an image sensor 4 (FIG. 1) to which image processor 6 is coupled. Image processor 6 may, however, obtain the image signal from other sources, e.g., over a network to which image processor 6 is coupled.

A kernel selection module 12 of image processor 6 selects one of a plurality of kernels to apply to the signal (42). Kernel selection module 12 may select the kernel based on whether an edge detection module 10 of image processor 6 is detecting edges in the vertical or horizontal direction. For example, some kernels may be formulated for vertical detection, while other kernels are formulated for horizontal detection. Kernel selection module 12 may also select the kernel based on other parameters, such as resolution of the image Edge detection module 10 applies the kernel to a first pixel to compute a sum for the pixel (44). In particular, edge detection module 10 centers the kernel on the first pixel and performs a convolution multiplies each of the pixel values within a portion of the image around the first pixel by the value of the corresponding location within the kernel and then sums the results. Edge detection module 10 identifies at least two first order derivatives based on the computed sum (46). As described above, a value of a first order of magnitude of the computed sum corresponds to a first, first order derivative and a value of a second order of magnitude of the sum corresponds to the second, first order derivative. Edge detection module 10 may obtain the first, first order derivative and the second, first order derivative by performing a divide operation on the computed sum and using the quotient and remainder of the divide operation as the first, first order derivative and the second, first order derivative, respectively.

Edge detection module 10 may normalize the at least two first order derivatives over the same span of pixels (48). The first, first order derivative corresponds to a first rise over a first span of pixels and the second, first order derivative corresponds to a second rise over a second span of pixels. In one example, the first, first order derivative may represent the slope between point 22 and 24 (FIG. 3A) and the second, first order derivative may represent the slope between points 20 and 24 (FIG. 3A). The first order derivatives may be normalized over the same span of pixels. This results in a reduced computational complexity and therefore provides several efficiency advantages over computing slopes using division operations.

Edge detection module 10 determines whether the second, first order derivative is within a threshold range of values (52). When the second, first order derivative is not within the threshold range of values ("NO" branch of 52), edge detection module 10 determines whether the second, first order derivative exceeds the threshold range (54). When edge detection module 10 determines that the second, first order derivatives exceeds the threshold range ("YES" branch of 54), edge detection module 10 detects that the pixel is located at a hard edge (56). When edge detection module 10 determines that the second, first order derivatives does not exceed the threshold range ("NO" branch of 54), edge detection module 10 detects that the pixel is not located at an edge (58).

When the second, first order derivative is within the threshold range of values ("YES" branch of 52), edge detection module 10 determines whether a ratio of the first, first order derivative and the second, first order derivative is within a threshold range of ratios (60). When the ratio is greater than or less than the threshold range of ratios ("NO" branch of 60), edge detection module 10 detects that the pixel is located at a hard edge (56). When the ratio is within the threshold range of ratios ("YES" branch of 60), edge detection module 10 detects that the pixel is located at a soft edge (62). Edge detection module 10 determines whether there are additional pixels within the image signal to which to apply the kernel (64). When there are no additional pixels ("NO" branch of 64), image processor 6 waits to obtain another signal (40). When there are additional pixels ("YES" branch of 64), edge detection module 10 applies the kernel to the next pixel in the image signal (44). In this manner, image processor 6 determines the shape of the portion of the signal, e.g., detects whether the pixel is at an edge, in a single pass of the kernel.

Figure 6:
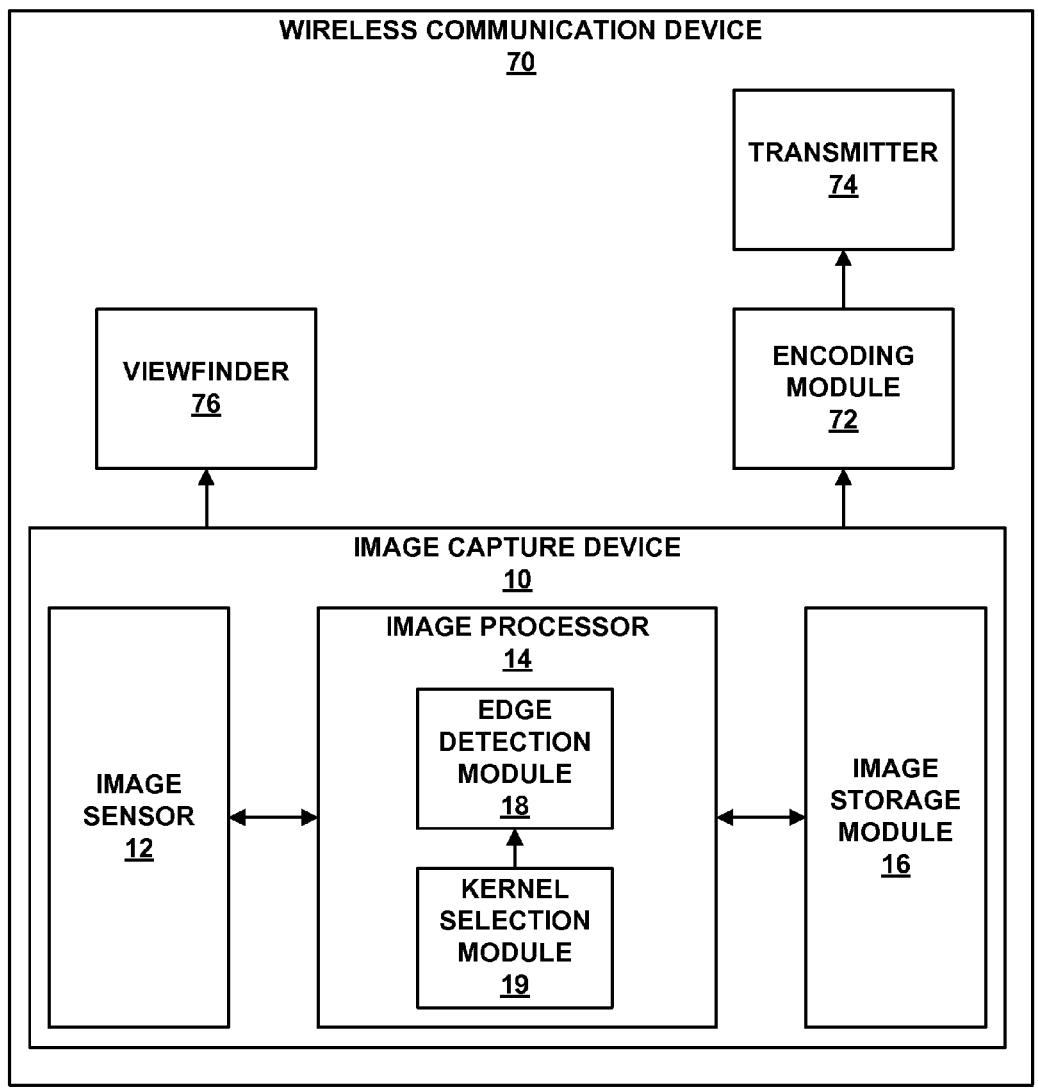
FIG. 6 is a block diagram illustrating an example wireless communication device that includes an image capture device that implements the edge detection techniques described in this disclosure.

FIG. 6 is a block diagram illustrating an example wireless communication device 70 that includes an image capture device 2 that implements the edge detection techniques described in this disclosure. FIG. 6 shows image capture device 2 integrated within wireless communication device 70. Operation of image capture device 2 is described above with respect to FIG. 1 and therefore will not be described in detail here. Wireless communication device 70 may comprise a wireless communication device handset, such as a cellular phone having image capturing capabilities (e.g., a so-called camera phone or video phone), a video recorder, a web cam, a personal digital assistant (PDA), a laptop computer or any other device having image capturing and wireless communication capabilities. Although illustrated in the context of a wireless communication device, the techniques of this disclosure may also be applicable to wired communication devices.

In the example of FIG. 6, wireless communication device 70 includes image capture device 2, an encoding module 72, a transmitter 74, and a viewfinder 76. Encoding module 72 may encode the captured image information to compress the image into a particular image compression format for storage and/or transmission. Encoding module 72 may compress the image using any of a number of image compression formats, including JPEG, TIFF, GIF or other image compression format. In the case of video, encoding module 72 may compress the video using any number of video compression formats, such as MPEG, MPEG Advanced Video Coding (AVC) part 10, ITU H.264 and the like.

Wireless communication device 70 may transmit the encoded image to another device via transmitter 74. Transmitter 74 typically provides an interface to a cellular network, such as a code division multiple access (CDMA) network, a wideband code division multiple access (W-CDMA) network, a time division multiple access (TDMA) network, and a global system for mobile communication (GSM) network, or other similar network. Transmitter 74, in addition or as an alternative to the cellular network, may provide an interface to a wireless network as defined by any of the relevant Institute of Electrical and Electronics Engineers (IEEE) 802.11 standards, or any other wired or wireless network.

Wireless communication device 70 may present either an image captured by image capture device 2 or a real-time image of the scene of interest to be captured by image capture device 2 (i.e., an image preview) on viewfinder 76. Viewfinder 76 may comprise an electronic viewfinder. Exemplary electronic viewfinders typically include one or more types of displays, such as a liquid crystal display (LCD), an organic light-emitting diode (OLED) display, a plasma display panel (PDP), a light-emitting diode (LED) display (e.g., an active matrix LED display), or any other type of display capable of presenting a captured or real-time image. Viewfinder 76 may also comprise a more conventional optical viewfinder instead of the above described electronic viewfinder. In the case of wireless communication device 70, viewfinder 76 may comprise a general purpose electronic display, where the display also presents information concerning other functions that wireless communication device 70 may perform. For example, if wireless communication device 70 represents the so-called camera phone, viewfinder 76 may also present information concerning the transmission and receipt of cellular phone calls.

Although described as including only image capture device 2, encoding module 72, transmitter 74, and a viewfinder 76, wireless communication device 70 may include other modules, such as a user interface (e.g., a keypad) for interfacing with a user, one or more processors for performing additional operations, and various ports and receptacles for accepting removable memory, headphones, power supplies, and any other such peripherals.

The techniques described herein may be implemented in hardware, software, firmware, or any combination thereof. Any features described as modules or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more DSPs, general purpose microprocessors, ASICs, field programmable logic arrays FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Hence, the disclosure also contemplates any of a variety of integrated circuit devices that include circuitry to implement one or more of the techniques described in this disclosure. Such circuitry may be provided in a single integrated circuit chip or in multiple, interoperable integrated circuit chips.

Although the techniques described in this disclosure are described in the context of digital image signals, the techniques may be used to detect locations of a signal that exhibit significant changes (e.g., edges) within any signal that represents a variable that is changing over time, space or other dimension. Moreover, the techniques of this disclosure may be used to determine how the variable changes over the detected locations. In this manner, the techniques may be viewed as detecting digital signal patterns and classifying the detected patterns. For example, the techniques of this disclosure may be used to detect digital signal patterns within audio signals, video signals or any other types of signals, and classifying those detected patterns.

Various aspects have been described. These and other aspects are within the scope of the following claims.

The invention claimed is:
1. A method comprising:
applying a kernel with a processor to a portion of a signal to compute at least a first, first order derivative of the portion of the signal and a second, first order derivative of the portion of the signal in a single pass of the kernel; and
determining a shape of the portion of the signal based on the first and second first order derivatives, wherein applying the kernel comprises applying a kernel having at least one row where a first column includes at least one negative value of a first order of magnitude, a second column includes at least one negative value of a second order of magnitude and a third column includes at least one positive value that includes a first component of the first order of magnitude and a second component of the second order of magnitude.

2. The method of claim 1, further comprising obtaining the signal, wherein the signal comprises a digital image signal.

3. The method of claim 1, wherein determining the shape of the portion of the signal comprises:
detecting an edge based on the first and second first order derivatives; and
determining a shape of the edge based on the first and second first order derivatives.

4. The method of claim 3, wherein detecting the edge comprises detecting the edge when one of the first and second first order derivatives is greater than a threshold.

5. The method of claim 3, wherein determining the shape of the edge comprises determining the shape of the edge based on a ratio between the first, first order derivative and the second, first order derivative.

6. The method of claim 5, wherein determining the shape of the edge comprises identifying the edge to be soft when the ratio is within a threshold range.

7. The method of claim 5, wherein determining the shape of the edge comprises identifying the edge to be hard when the ratio is greater than or less than a threshold range.

8. The method of claim 1, wherein the second order of magnitude is a function of a maximum possible value of the signal.

9. The method of claim 1, wherein applying the kernel to the signal to compute the first, first order derivative of a portion of the signal and the second, first order derivative of the portion of the signal in a single pass of the kernel comprises:
  multiplying non-negative values of the kernel by corresponding values of the portion of the signal to obtain weighted signal values;
  summing the weighted signal values;
  identifying a value of a first order of magnitude of the sum as the first, first order derivative; and
  identifying a value of a second, first order of magnitude of the sum as the second, first order derivative.

10. The method of claim 9, wherein:
  identifying the value of the first order of magnitude of the sum comprises identifying a quotient of a division operation as the value of the first order of magnitude of the sum, and
  identifying the value of the second order of magnitude of the sum comprises identifying a remainder of a division operation as the value of the second order of magnitude of the sum.

11. The method of claim 1, wherein determining the shape of the portion of the signal comprises determining the shape of the portion of the signal in a vertical direction based on the first and second first order derivatives, further comprising:
  applying a second kernel to the portion of the signal to compute a third, first order derivative of the portion of the signal and a fourth, first order derivative of the portion of the signal in a single pass of the second kernel; and
  determining a shape of the portion of the signal in a horizontal direction based on the third and fourth first order derivatives.

12. A device comprising
  a processor including an edge detection module to apply a kernel to a portion of a signal to compute at least a first, first order derivative of the portion of the signal and a second, first order derivative of the portion of the signal in a single pass of the kernel and determine a shape of the portion of the signal based on the first and second first order derivatives wherein the edge detection module applies a kernel having at least one row where a first column includes at least one negative value of a first order of magnitude, a second column includes at least one negative value of a second order of magnitude and a third column includes at least one positive value that includes a first component of the first order of magnitude and a second component of the second order of magnitude.

13. The device of claim 12, further comprising an image sensor to capture the signal, wherein the signal comprises a digital image signal, and wherein the processor obtains the digital image signal from the image sensor.

14. The device of claim 12, wherein the edge detection module detects an edge based on the first and second first order derivatives and determines a shape of the edge based on the first and second first order derivatives.

15. The device of claim 14, wherein the edge detection module detects the edge when one of the first and second first order derivatives is greater than a threshold.

16. The device of claim 14, wherein the edge detection module determines the shape of the edge based on a ratio between the first, first order derivative and the second, first order derivative.

17. The device of claim 16, wherein the edge detection module identifies the edge to be soft when the ratio is within a threshold range.

18. The device of claim 16, wherein the edge detection module identifies the edge to be hard when the ratio is greater than or less than a threshold range.

19. The device of claim 12, wherein the second order of magnitude is a function of a maximum possible value of the signal.

20. The device of claim 12, wherein the edge detection module multiplies non-negative values of the kernel by corresponding values of the portion of the signal to obtain weighted signal values, sums the weighted signal values, identifies a value of a first order of magnitude of the sum as the first, first order derivative, and identifies a value of a second, first order of magnitude of the sum as the second, first order derivative.

21. The device of claim 20, wherein the edge detection module identifies a quotient of a division operation as the value of the first order of magnitude of the sum and identifies a remainder of a division operation as the value of the second order of magnitude of the sum.

22. The device of claim 12, wherein the edge detection module determines the shape of the portion of the signal in the vertical direction based on the first and second first order derivatives, applies a second kernel to the portion of the signal to compute a third, first order derivative of the portion of the signal and a fourth, first order derivative of the portion of the signal in a single pass of the second kernel, and determines the shape of the portion of the signal in a horizontal direction based on the third and fourth first order derivatives.

23. The device of claim 12, wherein the device comprises a wireless communication device.

24. The device of claim 12, wherein the device comprises an integrated circuit device.

25. A non-transitory computer readable medium comprising instructions to cause a processor to:
  apply a kernel to a portion of a signal to compute at least a first, first order derivative of the portion of the signal and a second, first order derivative of the portion of the signal in a single pass of the kernel; and
  determine a shape of the portion of the signal based on the first and second first order derivatives wherein instructions to cause the processor to apply the kernel comprise instructions to cause the processor to apply a kernel having at least one row where a first column includes at least one negative value of a first order of magnitude, a second column includes at least one negative value of a second order of magnitude and a third column includes at least one positive value that includes a first component of the first order of magnitude and a second component of the second order of magnitude.

26. The computer-readable medium of claim 25, further comprising instructions to cause the processor to obtain the signal, wherein the signal comprises a digital image signal.

27. The computer-readable medium of claim 25, wherein instructions to cause the processor to determine the shape of the portion of the signal comprise instructions to cause the processor to:
  detect an edge based on the first and second first order derivatives; and
  determine a shape of the edge based on the first and second first order derivatives.

28. The computer-readable medium of claim 27, wherein instructions to cause the processor to detect the edge comprise instructions to cause the processor to detect the edge when one of the first and second first order derivatives is greater than a threshold.

29. The computer-readable medium of claim 27, wherein instructions to cause the processor to determine the shape of the edge comprise instructions to cause the processor to determine the shape of the edge based on a ratio between the first, first order derivative and the second, first order derivative.

30. The computer-readable medium of claim 29, wherein instructions to cause the processor to determine the shape of the edge comprise instructions to cause the processor to code for identify the edge to be soft when the ratio is within a threshold range.

31. The computer-readable medium of claim 29, wherein instructions to cause the processor to determine the shape of the edge comprise instructions to cause the processor to identify the edge to be hard when the ratio is greater than or less than a threshold range.

32. The computer-readable medium of claim 25, wherein the second order of magnitude is a function of a maximum possible value of the signal.

33. The computer-readable medium of claim 25, wherein instructions to cause the processor to apply the kernel to the signal to compute the first, first order derivative of a portion of the signal and the second, first order derivative of the portion of the signal in a single pass of the kernel comprise instructions to cause the processor to:
multiply non-negative values of the kernel by corresponding values of the portion of the signal to obtain weighted signal values;
sum the weighted signal values;
identify a value of a first order of magnitude of the sum as the first, first order derivative; and
identify a value of a second, first order of magnitude of the sum as the second, first order derivative.

34. The computer-readable medium of claim 33, wherein:
instructions to cause the processor to identify the value of the first order of magnitude of the sum comprise instructions to cause the processor to identify a quotient of a division operation as the value of the first order of magnitude of the sum, and
instructions to cause the processor to identify the value of the second order of magnitude of the sum comprise instructions to cause the processor to identify a remainder of a division operation as the value of the second order of magnitude of the sum.

35. The computer-readable medium of claim 25, wherein instructions to cause the processor to determine the shape of the portion of the signal comprise instructions to cause the processor to determine the shape of the portion of the signal in a vertical direction based on the first and second first order derivatives, further comprising instructions to cause the processor to:
apply a second kernel to the portion of the signal to compute a third, first order derivative of the portion of the signal and a fourth, first order derivative of the portion of the signal in a single pass of the second kernel; and
determine a shape of the portion of the signal in a horizontal direction based on the third and fourth first order derivatives.

36. A device comprising:
means for applying a kernel to a portion of a signal to compute at least a first, first order derivative of the portion of the signal and a second, first order derivative of the portion of the signal in a single pass of the kernel; and
means for determining a shape of the portion of the signal based on the first and second first order derivatives wherein the kernel application means applies a kernel having at least one row where a first column includes at least one negative value of a first order of magnitude, a second column includes at least one negative value of a second order of magnitude and a third column includes at least one positive value that includes a first component of the first order of magnitude and a second component of the second order of magnitude.

37. The device of claim 36, further comprising means for obtaining the signal, wherein the obtaining means obtains a digital image signal.

38. The device of claim 36, wherein the shape determining means detects an edge based on the first and second first order derivatives and determines a shape of the edge based on the first and second first order derivatives.

39. The device of claim 38, wherein the shape determining means detects the edge when one of the first and second first order derivatives is greater than a threshold.

40. The device of claim 38, wherein the shape determining means determines the shape of the edge based on a ratio between the first, first order derivative and the second, first order derivative.

41. The device of claim 40, wherein the shape determining means identifies the edge to be soft when the ratio is within a threshold range.

42. The device of claim 40, wherein the shape determining means identifies the edge to be hard when the ratio is greater than or less than a threshold range.

43. The device of claim 36, wherein the second order of magnitude is a function of a maximum possible value of the signal.

44. The device of claim 36, wherein the kernel application means applies multiplies non-negative values of the kernel by corresponding values of the portion of the signal to obtain weighted signal values, sums the weighted signal values, identifies a value of a first order of magnitude of the sum as the first, first order derivative, and identifies a value of a second, first order of magnitude of the sum as the second, first order derivative.

45. The device of claim 44, wherein the kernel application means identifies a quotient of a division operation as the value of the first order of magnitude of the sum and identifies a remainder of a division operation as the value of the second order of magnitude of the sum.

46. The device of claim 36, wherein the shape determining means determines the shape of the portion of the signal in a vertical direction based on the first and second first order derivatives, the kernel application module applies a second kernel to the portion of the signal to compute a third, first order derivative of the portion of the signal and a fourth, first order derivative of the portion of the signal in a single pass of the second kernel, and the shape determining means determines the shape of the portion of the signal in a horizontal direction based on the third and fourth first order derivatives.

* * * * *